United States Patent [19]

Taft

[11] 4,195,849
[45] Apr. 1, 1980

[54] PISTON FLUID SEAL MOUNTING

[75] Inventor: Morris E. Taft, Metamora, Ill.

[73] Assignee: Caterpillar Tractor Co., Peoria, Ill.

[21] Appl. No.: 30,243

[22] PCT Filed: Feb. 15, 1979

[86] PCT No.: PCT/US79/00091

§ 371 Date: Feb. 15, 1979

§ 102(e) Date: Feb. 15, 1979

[51] Int. Cl.$^2$ .............................................. F16J 15/32
[52] U.S. Cl. ............................... 277/12; 277/188 R; 277/205
[58] Field of Search ................. 92/240, 241, 245; 277/205, 212 R, 212 C, 12, 188 R

[56] References Cited

U.S. PATENT DOCUMENTS

| 320,829 | 6/1885 | Woodbury | 92/240 |
| 1,618,412 | 2/1927 | Dorward | 92/240 X |
| 2,626,839 | 1/1953 | Creson et al. | 277/205 X |
| 2,742,333 | 4/1956 | Taylor | 92/240 X |
| 2,926,976 | 3/1960 | Bowerman et al. | 92/240 |
| 4,116,452 | 9/1978 | Schanz | 277/205 |

FOREIGN PATENT DOCUMENTS 534215 10/1955 Italy .......................................... 92/240

Primary Examiner—Robert S. Ward, Jr.
Attorney, Agent, or Firm—Wegner, Stellman, McCord, Wiles & Wood

[57] ABSTRACT

A cylinder (10) and piston (14) device has a piston (14) with a circumferential fluid seal mounting band (17) near one of its ends, a step (19) defining a piston end portion (20) of smaller diameter than the band (17), and a snap-ring groove (21) in the end portion (20) near the step (19). A stressed fluid seal (22) which is mounted on the band (17) has an unstressed diameter (across 25) less than that of the band (17) but greater than that of the piston end portion (20); and a retaining ring (27) for the fluid seal (22) is held adjacent the step (19) by a snap-ring (28) in the groove (21).

3 Claims, 3 Drawing Figures

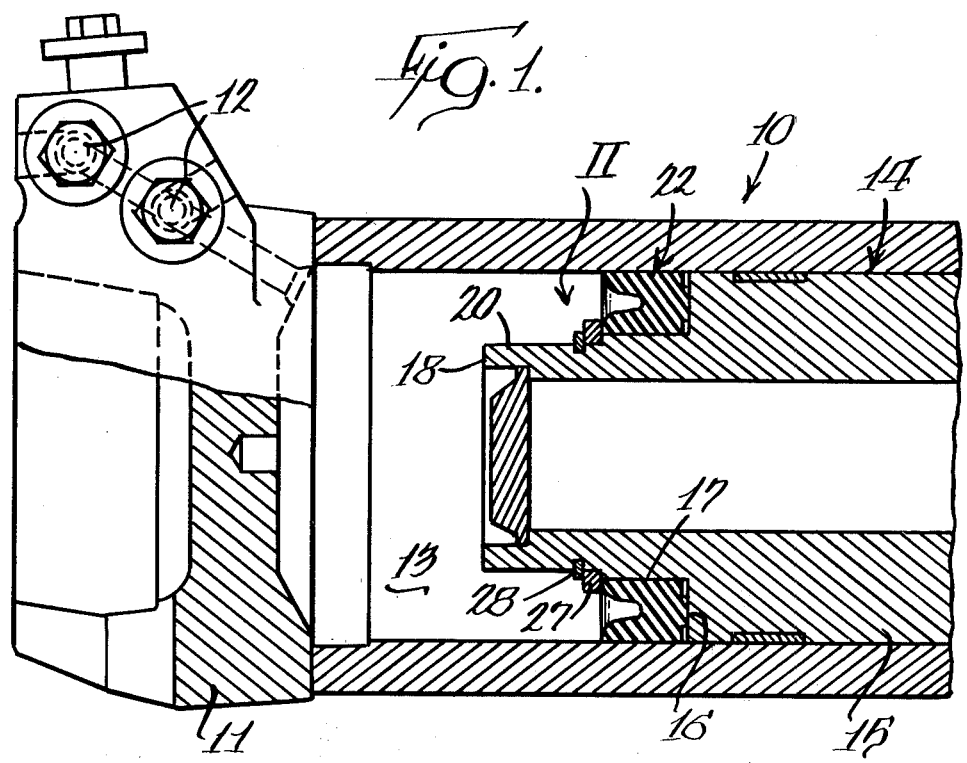
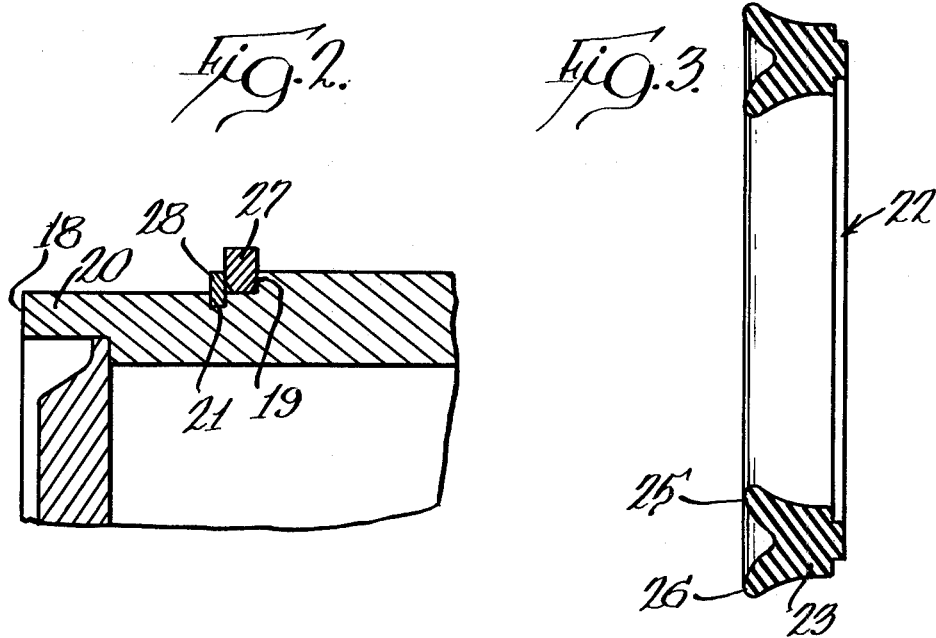

1

PISTON FLUID SEAL MOUNTING

DESCRIPTION

1. Technical Field

This invention relates to an improvement in piston and cylinder devices of the type in which a snugly encircling fluid seal is mounted on a piston near one of its ends.

2. Background Art

U.S. Pat. Nos. 3,792,910 and 3,826,543 both disclose typical prior art cylinder and piston devices of the type with which the present invention is concerned. Such devices have a fluid seal carried near one end of a piston, and a snap-ring groove between the seal and the piston end receives a seal retaining snap-ring.

Such a seal ordinarily has an inside diameter slightly less than the outside diameter of the piston end portion upon which it is mounted, so that the seal must be stressed to stretch it around the piston end portion. The appearance of the mounted seal is much as illustrated in those patents; but before the seal is mounted its cross section is most easily described as Y-shaped, with a base and diverging arms. One of those arms bears upon the piston surface and the other bears upon the cylinder wall. The stressing of the seal during mounting compresses the diverging arms substantially to the shape illustrated in the identified prior art patents.

The extremity of the one arm of the seal is small enough that if the snap-ring and seal must be removed for servicing the piston, the arm of the seal is very likely to catch in the snap-ring groove, which makes removal of the seal very difficult and is likely to cause damage to the seal.

DISCLOSURE OF THE INVENTION

The present invention is directed to overcoming the problems set forth above.

According to the present invention, a cylinder and piston device has a piston with a circumferential fluid seal mounting band near one of its ends, a step defining a piston end portion of smaller diameter than the band, and a snap-ring groove in the end portion near the step. A stressed fluid seal which is mounted on the band has an unstressed diameter less than that of the band but greater than that of the piston end portion; and a retaining ring for the fluid seal is held adjacent the step by snap-ring in the groove.

BRIEF DESCRIPTION OF DRAWINGS

FIG. 1 is a fragmentary, longitudinal sectional view of a cylinder and piston device embodying the present invention;

FIG. 2 is a fragmentary sectional view on an enlarged scale of the area designated II in FIG. 1; and FIG. 3 is a sectional view on the same scale as FIG. 2 showing the fluid seal in its unstressed condition.

BEST MODE FOR CARRYING OUT THE INVENTION

Referring to FIG. 1 of the drawings, a cylinder, indicated generally at 10, has a head structure 11 provided with fluid connections 12 through which fluid may pass in and out of the interior 13 of the cylinder. A piston, indicated generally at 14, has a body 15 which makes an easy sliding fit within the cylinder 10, and a radially extending, circumferential shoulder 16 defines one margin of a circumferential seal-carrying band 17 which is spaced from an end 18 of the piston. A step 19 defines a piston end portion 20 which is smaller in diameter than the band 17, and there is a circumferential snap-ring groove 21 in the piston end portion 20 close to the step 19.

A fluid seal, indicated generally at 22, is best seen in FIG. 3 to have a base portion 23 which is generally rectangular in cross section and has a rib 24 that seats against the shoulder 16. As seen in cross section, the seal also has a pair of diverging arms, of which a first arm 25 bears on the mounting band 17 while the second arm 26 bears on the wall of the cylinder 10. Thus, the seal 22 is generally Y-shaped in cross section, with an internal diameter across the arm 25 which is considerably less than the outside diameter of the band 17, and an outside diameter across the arm 26 which is considerably greater than the inside diameter of the cylinder 10. Thus, when the seal 22 is installed upon the piston the arms 25 and 26 are stressed to the shape which is seen in FIG. 1. Although the free state internal diameter of the seal across the arm 25 is less than the diameter of the band 17, it is greater than the diameter of the piston end portion 20.

A seal retaining ring 27 makes an easy sliding fit upon the piston end portion 20 and is narrow enough to fit between the step 16 and the snap-ring groove 21. The retaining ring 27 has an outer circumferential surface 27a of a substantially constant diameter which is greater than the diameter of the band 17 but less than the inside diameter of the cylinder 10.

A snap-ring 28 fits in the snap-ring groove 21, so the retaining ring 27 is confined between the snap-ring and the step 16.

Industrial Applicability

The improved piston fluid seal mounting of the present invention may be utilized in any industrial application which requires an annular seal that is stressed for mounting around a piston near one of its ends, and which requires a retaining ring between the seal and the end of the piston. A typical application is in the type of cylinder and piston devices disclosed in U.S. Pat. Nos. 3,792,910 and 3,826,543.

Providing the piston with the end portion 20 of reduced diameter permits the fluid seal 22 to be removed from the piston with no danger that the narrow extremity 25a of the inner arm 25 may catch in the snap-ring groove 21.

Other aspects, objects and advantages of this invention can be obtained from a study of the drawings, the disclosure and the appended claims. The foregoing detailed description has been given for clearness of understanding only and no unnecessary limitations should be understood therefrom as modifications will be obvious to those skilled in the art.

1. In a cylinder (10) and piston (14) device of the type in which a snugly encircling fluid seal (22) is mounted on the piston (14) near one (18) of its ends, the improvement comprising:

a piston (14) having a circumferential seal-carrying band (17) spaced from said one (18) of its ends, and a circumferential step (19) defining a piston end portion (20) which is smaller in diameter than said band (17), and there being a circumferential snap-ring groove (21) in said piston end portion (20) close to said step (19);

a stressed fluid seal (22) mounted on said band (17), said fluid seal (22) having an unstressed internal diameter (across 25) less than that of said band (17) but greater than that of said piston end portion (20);

a fluid seal retaining ring (27) between the step (19) and the snap-ring groove (21), said retaining ring (27) projecting radially past the surface of the band (17) but having no part of larger diameter than the inside diameter of the cylinder (10);

and a snap-ring (28) in the groove (21) to hold said retaining ring (27) adjacent the step (19).

2. The improvement of claim 1 in which the retaining ring (27) has a substantially constant outer diameter (at 27a) greater than the diameter of the band (17) but less than the inside diameter of the cylinder (10).

3. The improvement of claim 1 in which the fluid seal (22) is generally Y-shaped in cross section, with a base 23 and diverging arms (25 and 26), one arm (25) of the Y bears on the band (17) and the other arm (26) bears on the cylinder (10), and said one arm (25) of the Y has an extremity (25a) which is narrower than the snap-ring groove (21).

* * * * *

Disclaimer 4,195,849.—*Morris E. Taft*, Metamora, Ill. PISTON FLUID SEAL MOUNTING. Patent dated Apr. 1, 1980. Disclaimer filed June 18, 1981, by the assignee, *Caterpillar Tractor Co.*

Hereby enters this disclaimer to claims 1, 2 and 3 of said patent.

[*Official Gazette June 15, 1982.*]